United States Patent [19]

Houser

[11] Patent Number: 4,874,929
[45] Date of Patent: Oct. 17, 1989

[54] TOASTER OVEN/BROILER WITH CONTINUOUSLY ENERGIZED INDICATOR

[75] Inventor: Philip H. Houser, Chillicothe, Ohio
[73] Assignee: Proctor-Silex, Inc., Glen Allen, Va.
[21] Appl. No.: 124,733
[22] Filed: Nov. 24, 1987
[51] Int. Cl.[4] ............................................. H05B 1/02
[52] U.S. Cl. ................................... 219/506; 219/483; 219/486; 219/494; 99/342; 99/331
[58] Field of Search ............... 219/506, 494, 497, 518, 219/492, 490, 491, 483, 486; 99/325, 328, 331, 329 R, 329 P, 329 RT, 339, 341, 342

[56] References Cited

U.S. PATENT DOCUMENTS

| | | | |
|---|---|---|---|
| 3,517,605 | 6/1970 | Hursch et al. | 99/423 |
| 3,660,637 | 5/1972 | Grove | 219/413 |
| 4,189,632 | 2/1980 | Swanson et al. | 219/413 |
| 4,302,660 | 11/1981 | Swanson et al. | 219/391 |
| 4,309,584 | 1/1982 | Terakami | 219/506 |
| 4,345,145 | 8/1982 | Norwood | 219/506 |
| 4,510,376 | 4/1985 | Schneider | 219/518 |
| 4,580,034 | 4/1986 | Roth | 219/327 |
| 4,755,556 | 7/1988 | Charlesworth et al. | 219/518 |

FOREIGN PATENT DOCUMENTS 3138703  4/1983  Fed. Rep. of Germany ...... 219/506

OTHER PUBLICATIONS

Copy of Paragraph 19A.1 and 19A.2 of Underwriter Laboratories, Inc., Standard 1026.

*Primary Examiner*—M. H. Paschall
*Attorney, Agent, or Firm*—Roger S. Dybvig

[57] ABSTRACT

A toaster oven/broiler is provided with a visual indicator which is continuously illuminated when the device is in the toast, oven or broil mode. The indicator is not extinguished when the device is in the oven mode and thermostat switch contacts open to deenergize the heating elements.

18 Claims, 1 Drawing Sheet

TOASTER OVEN/BROILER WITH CONTINUOUSLY ENERGIZED INDICATOR

BACKGROUND OF THE INVENTION

The present invention relates to circuits for controlling kitchen appliances such as toaster ovens and toaster oven/broilers, and more particularly to a circuit including a pilot light which is continuously illuminated when the device is operating in a toast, oven or broiler mode.

Toaster oven/broiler devices are well known in the art and provide, in a single appliance, the capability of toasting, broiling, warming and baking. It has long been the practice to provide some form of indicator for visually indicating to the operator that the heating coils of the device are being energized. The indicator has taken many forms, i.e. a pilot light or the position of a switch, or both. For example, toaster-oven/broiler devices have been provided wherein a pilot light is continuously energized during the oven or broiler mode even though thermostat contacts interrupt energization of the heating elements. However, these devices, as shown in accompanying FIG. 1, do not energize the pilot light during the toast mode but instead rely on the position of a toast switch or lever to provide an indication that no power is being applied.

U.S. Pat. Nos. 4,302,660 and 4,189,632 to Swanson et al. disclose a toaster oven wherein a protrusion on a selector dial cooperates with an "off" marking on the cabinet to indicate that no power is being applied to the device. In addition, a pilot light is provided which is energized only when the heating elements are energized. At the end of a toast cycle a thermal timer deenergizes both the heating elements and the pilot light even though power is still being applied to the device through the power switch. In like manner, thermostat contacts intermittently open during the oven mode to deenergize both the heating elements and the pilot light.

Toaster-oven devices having indicators of the type described above fail to meet the soon-to-be-effective standard of Underwriters Laboratories, Inc. which provides that toaster ovens or toaster oven/broilers shall have a power-on indicator in the form of an illuminated switch or pilot light which remains on during any operating condition including the cycling of any thermostat. The standard specifically indicates that an on/off switch position marking alone is unacceptable.

SUMMARY OF THE INVENTION

An object of the present invention is to provide a kitchen appliance indicator circuit for continuously energizing an indicator anytime the appliance is not in the "off" mode.

An object of the present invention is to provide a control and indicator circuit suitable for use in toaster ovens and toaster oven/broilers, the circuit being arranged such that the indicator is energized continuously regardless of whether the device is operating in the toaster, oven or broil mode.

An appliance constructed in accordance with the principles of the present invention includes a plurality of heating elements, toast mode switch contacts which are closed when the appliance is in the toast mode to complete a circuit for applying a voltage to the heating elements, thermostatic switch contacts connected in parallel with the toast mode switch contacts and responsive to the temperature in the appliance during an oven mode of operation for intermittently applying a voltage to the heating elements, an indicator circuit continuously energized through the toast mode switch contacts during the toast mode, and control contacts through which the indicator circuit is continuously energized during the oven mode of operation. The indicator circuit includes a pilot light and two resistors connected in series across a supply voltage. One of the resistors is connected in parallel with the thermostatic switch contacts and has a resistance which is considerably greater than the resistance of the heating elements so that the heating elements are, in essence, deenergized although they are connected in series with the resistor across the voltage source.

Other objects of the invention and its mode of operation will become apparent upon consideration of the following description and the accompanying drawings.

DETAILED DESCRIPTION OF THE INVENTION

Figure 1:
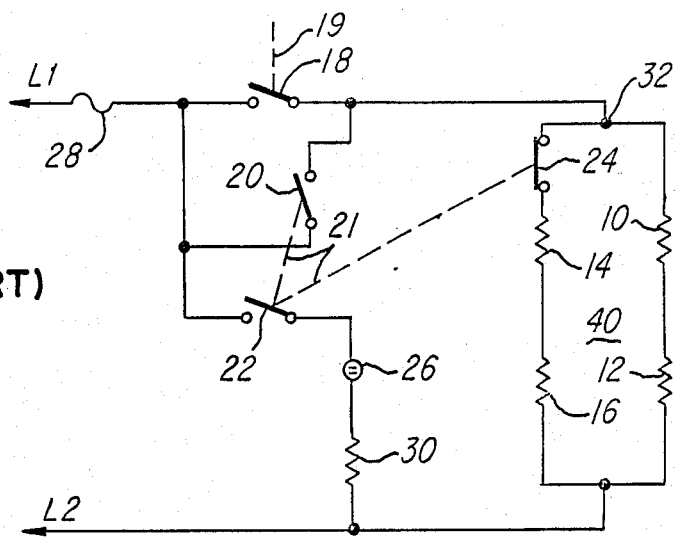
FIG. 1 is a wiring diagram for a prior art toaster oven/broiler control and indicator circuit.

FIG. 1 shows a prior art circuit for a toaster oven/broiler. The circuit comprises a heating means having four heating elements 10, 12, 14 and 16, toast switch contacts 18, oven thermostat switch contacts 20, pilot light switch contacts 22, broil switch contacts 24 and a visual indicator or pilot light 26. The circuit is connected to a power supply (not shown) by a supply cord, the output voltage of the power supply being applied to the circuit across two leads L1 and L2. A fuse 28 is provided in the lead L1. If a polarized plug is used on the supply cord the lead L2 is connected to the larger blade which is normally the grounded side of the 120 V power supply.

Toast switch contacts 18 are controlled by a toast switch mechanism which may be of conventional design, including a latch for latching the contacts closed when a manual control is actuated to initiate a toast cycle and a thermally responsive latch release mechanism for releasing the latch when the toast cycle is complete. Since the toast switch mechanism is of conventional design it is not shown in detail but is symbolically indicated by reference numeral 19.

In like manner, switch contacts 20, 22 and 24 are controlled by an oven control mechanism symbolically indicated at 21. The oven control mechanism includes a manually rotatable dial having at least an "off" position, an "oven" position and a "broil" position. The "oven" position may actually comprise a plurality of temperature selection positions. When the dial is in the "off" position the contacts 20, 22 and 24 are in the positions shown in FIG. 1. When the dial is in the "oven" position the mechanism adjusts one contact of thermostatic switch contacts 20 so that the contacts open when the temperature in the device reaches the temperature selected by the dial. When the dial is in the "broil" position the oven control mechanism opens the contacts 24 and adjusts one contact of thermostatic switch contacts 20 so that they will open when the temperature in the device reaches some predetermined temperature. Pilot light switch contacts 22 are closed anytime the dial is not in the "off" position.

Toast switch contacts 18 and the heating means 40 are connected in a first series circuit between leads L1 and L2 so that when contacts 18 are closed to initiate the toast mode a voltage is applied to the heating means. The heating means 40 comprises upper front and rear heating elements 10 and 12 connected in parallel with lower front and rear heating elements 14 and 16. Broil switch contacts 24 are connected in series with the lower heating elements 14 and 16.

Thermostatic switch contacts 20 are connected to heating means 40 and form therewith a second series circuit connected between leads L1 and L2 with contacts 20 being connected in parallel with contacts 18.

Pilot light switch contacts 22, pilot light 26 and a resistor 30 are connected to form a third series circuit connected between leads L1 and L2. Since contacts 22 are closed anytime the oven control dial is not in the "off" position, the pilot light is continuously energized when the dial is set to the "oven" or "boil" position.

FIG. 1 illustrates the circuit when the toast switch and oven control dial are both in the "off" position. The contacts 18, 20 and 22 are open and the broil switch contacts 24 are closed. Therefore, no current flows throgh the heating elements 10, 12, 14 and 16 or the indicator 26.

To initiate a cycle in the toast mode, the toast switch mechanism 19 is actuated to latch toast switch contacts 18 closed. Current then flows from line L1 through fuse 28, contacts 18 to junction 32. From junction 32 the current flows through two parallel paths to line L2, one of the paths including heating elements 10 and 12 and the other of the paths including heating elements 14 and 16 and broiler switch contacts 24. All of the heating elements are energized until toast switch contacts 18 are unlatched as described above to terminate the toast cycle.

To select the "oven" mode of operation the dial is set to the "oven" position at one of the desired temperature setting thereby closing switch contacts 20 and 22. This setting of the dial does not open the broiler switch contacts 24. Therefore, lower heating elements 14 and 16 are energized in parallel with the upper heating elements 10 and 12. Energization of the heating elements is intermittent, i.e. during intervals when thermostatic switch contacts 20 are closed because the temperature in the device is lower than the temperature selected by the oven control dial setting.

In the oven mode the heating elements are all energized by a circuit which extends from line L1 through fuse 28, thermostat switch contacts 20 (now closed), and the heating elements to line L2. The action of thermostat switch contacts 20 is dependent on the actual oven temperature so that after the temperature in the device reaches the selected temperature the contacts 20 intermittently open and close to thereby intermittently energize the heating elements and maintain the selected temperature.

To initiate the broil mode of operation the oven control dial is set to the "broil" position where it closes contacts 20 and 22 and opens contacts 24. The opening of contacts 24 prevents the lower heating elements 14 and 16 from being energized. However, the upper heating elements 10 and 12 are energized by a circuit extending from line L1 through fuse 28, thermostat switch contacts 20 (now closed) and heating elements 10 and 12 to line L2. As in the oven mode, the action of thermostat switch contacts is dependent on the actual oven temperature. However, the oven control dial adjusts one of the contacts 20 so that normally the contacts remain closed in the broil mode.

The oven control dial closes the switch contacts 22 at any dial position other than the "off" position. Therefore, when the circuit is operating in either the broil or the oven mode there is a circuit extending from line L1 through fuse 28, contacts 22, pilot light 26 and resistor 30 to line L2. This energizes the visual indicator 26 to provide an indication that power is applied to the circuit.

Since the oven control dial which controls switches 20, 22 and 24 should be in the "off" position when the switch contacts 18 are closed to initiate a toast cycle, the indicator 26 can provide no warning that power is being applied to the device when it is in a toast cycle.

Figure 2:
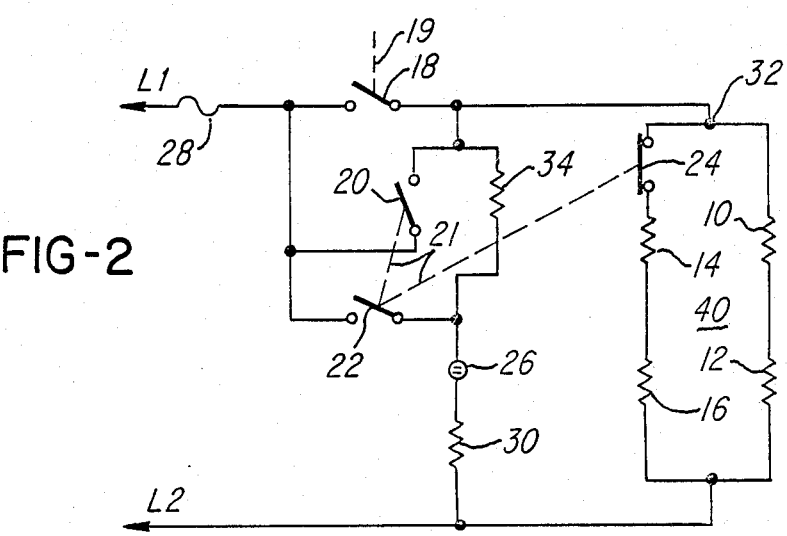
FIG. 2 is a wiring diagram for toaster oven/broiler control and indicator circuit according to the present invention; and, FIG. 3 is a wiring diagram illustrating a further modification of the circuit of FIG. 2.

FIG. 2 is a circuit diagram illustrating a toaster oven/broiler circuit wherein the pilot light is continuously illuminated regardless of whether the device is operating in the toast, broil or oven mode. The circuit of FIG. 2 differs from that shown in FIG. 1 only by the addition of a second resistor 34 connected so that it is in series with switch contacts 22 and in parallel with thermostatic switch contacts 20 when the device is operating in the oven or broiler mode. Resistor 34 is further connected between the toast switch contacts 18 and the pilot light 26 so as to form a series circuit including resistors 30 and 34 and pilot light 26, connected between leads L1 and L2.

When the pilot light switch contacts 22 are closed as a result of setting the oven control dial to the "oven" or "broil" position, they connect resistor 34 in parallel with the thermostat switch contacts 20. When the thermostat switch contacts 20 are closed the heating elements are energized as previously described by a circuit extending through the closed contacts 20. During these intervals resistor 34 sees no potential and dissipates on energy. When the oven temperature reaches a set level to open contacts 20, the heating elements are connected in series with resistor 34 and switch contacts 22 across the supply voltage. If the resistance of resistor 34 is fairly large (compared to the resistance of the heating elements), the voltage drop across the resistor 34 is very nearly equal to the supply voltage and the heating elements are essentially deenergized.

In the broil or oven mode the pilot light 26 of FIG. 2 is continuously energized through contacts 22 as previously described with reference to FIG. 1.

In the toast mode the heating elements of FIG. 2 are energized in exactly the same manner as the heating elements of FIG. 1. However, the pilot light 26 of FIG. 2 is continuously energized during the toast mode by a circuit extending from line L1 through fuse 28, toast switch contacts 18, resistor 34, pilot light 26 and resistor 30 to line L2.

Since resistor 34 is connected in series with resistor 30 during the toast mode, there is a drop in the voltage across the pilot light 26 with a consequent slight but acceptable dimming of the pilot light. This lower illumination can, if desired, be alleviated somewhat by decreasing the value of resistor 30 or resistor 34. However, reducing the value of resistor 30 increases the wattage dissipated by the resistor during the oven or broil mode and reducing the value of resistor 34 increases the wattage dissipated by resistor 34 during the oven or broil mode when the thermostat switch contacts 20 are open. By way of example only, resistors 30 and 34 may be on the order of 30K ohms and the pilot lamp 26 may be a gaseous vapor discharge lamp such as the model ASA C2A neon lamp produced by Xenell Corporation.

Figure 3:
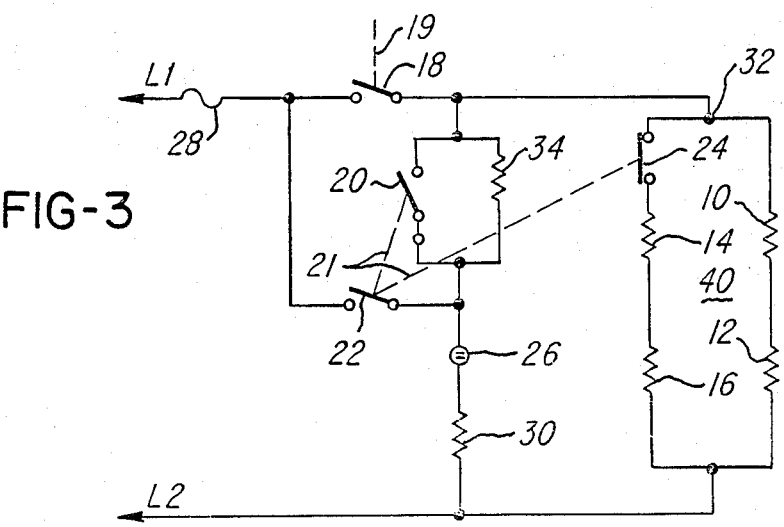

FIG. 3 illustrates a modification of the circuit of FIG. 2 wherein the thermostat switch contacts 20 are permanently connected in parallel with the resistor 34, the parallel circuits being connected between toast switch contacts 18 and the oven control dial contacts 22. In this modification the supply voltage is applied through contacts 22 in series with contacts 20 to energize the heating elements in the oven and broil modes. Otherwise, the circuit of FIG. 2 operates in the same way as the circuit shown in FIG. 2.

From the foregoing description it is seen that the present invention provides a simple and economical means for complying with Underwriters Laboratories standards by providing a toaster oven/broiler circuit with a pilot light that is illuminated during the toast, oven or broil mode and remains continuously illuminated despite cycling of the thermostat switch contacts.

While preferred embodiments of the invention have been described in specific detail, it will be understood that various modifications and substitutions may be made in the described embodiments without departing from the spirit and scope of the invention as defined by the appended claims.

The embodiments of the invention in which an exclusive property or privilege are claimed are defined as follows:

1. A control and indicator circuit for a kitchen appliance operable in a toast mode and an oven mode and having first and second leads for connecting said appliance to a voltage source, said circuit comprising:
   a toast mode switch for initiating said toast mode;
   heating means connected between said toast mode switch and said second lead whereby said heating means is continuously energized during said toast mode;
   thermostatic switch means having contacts connected in parallel with said toast mode switch and in series with said heating means, said thermostatic switch means being responsive to heat generated by said heating means for selectively deenergizing said heating means during said oven mode by opening said contacts to control the temperature in said appliance;
   control switch means and an indicator circuit means including indicator means connected in a series circuit between said first and second leads, said control switch means being closed only during said oven mode; and,
   resistor means connected at one side to said toast mode switch, said thermostatic switch means and said heating means and connected at the other side to said series circuit intermediate said control switch means and said indicator means.

2. A control and indicator circuit as claimed in claim 1 wherein said indicator means includes a pilot light continuously energized through said resistor means during said toast mode, said pilot light being continuously energized during said oven mode through said control switch means.

3. A control and indicator circuit as claimed in claim 1 wherein the resistance of said resistor means is considerably greater than the resistance of said heating means whereby said heating means is deenergized during said oven mode when said contacts are open.

4. A control and indicator circuit as claimed in claim 3 wherein said indicator circuit means includes a further resistor connected in series with said pilot light.

5. A control and indicator circuit as claimed in claim 4 wherein said pilot light is a gaseous vapor discharge lamp.

6. In a kitchen appliance having first and second leads to which a voltage source may be applied, said appliance being operable in at least a first mode and a second mode and including a first series circuit connected between said first and second leads, said first series circuit including heating means and first switch means for closing said series circuit in said first mode, a second series circuit connected between said first and second leads, said second series circuit including said heating means and a thermostatic switch means connected in parallel with said first switch means for intermittently closing said second series circuit when in said second mode, and indicator circuit means including an indicator operable in at least one of said modes to indicate that a voltage is being applied to said heating means, the improvement wherein said indicator circuit means comprises a third series circuit connected in parallel with said heating means, said third series circuit including a resistor connected in parallel with said thermostatic switch means in said second mode, and a fourth series circuit connected between said first and second leads, said fourth series circuit including a further switch means connected at one side to said first lead and at the other side to said third series circuit for energizing said indicator in said second mode whereby said indicator is continuously energized when said appliance is in either said first mode or said second mode.

7. A control and indicator circuit for a kitchen appliance operable in a toast mode for continuously applying an input voltage to a heating means through a pair of toast switch contacts and operable in an oven mode for intermittently applying the input voltage to said heating means through a pair of oven switch contacts and a pair of thermostatic switch contacts responsive to the temperature in said appliance, said control and indicator circuit comprising:
   an indicator,
   circuit means connected to said indicator and one of said oven switch contacts for continuously energizing said indicator for as long as said oven switch contacts are closed; and,
   further circuit means connected to said indicator and one of said toast switch contacts for continuously energizing said indicator for as long as said toast switch contacts are closed.

8. A control and indicator circuit as claimed in claim 7 wherein said further circuit means comprises a resistor connected in series with said toast switch contacts and said indicator.

9. A control and indicator circuit as claimed in claim 8 wherein said resistor is also connected in parallel with said thermostatic switch contacts.

10. A control and indicator circuit as claimed in claim 8 wherein the resistance of said resistor is substantially greater than the resistance of said heating means.

11. A control and indicator circuit as claimed in claim 9 wherein the resistance of said resistor is substantially greater than the resistance of said heating means.

12. A control and indicator circuit as claimed in claim 7 wherein said indicator is a gaseous vapor discharge lamp.

13. In a kitchen appliance operable in at least a first mode for continuously energizing a heating means and a second mode wherein the heating means is intermittently energized through a thermostatic switch means which opens in response to the temperature within the appliance, the improvement comprising:

an indicator means;

a first circuit for continuously energizing said indicator means in parallel with said heating means during said first mode;

a second circuit for continuously energizing said indicator means in parallel with said intermittently energized heating means during said second mode;

said first circuit including a resistor connected in parallel with the thermostatic switch means, the resistance of said resistor being relatively high compared to the resistance of said heating means to thereby isolate said heating means from said second circuit during said second mode when said thermostatic switch means is open.

14. The improvement as claimed in claim 13 wherein said indicator means comprises a gaseous vapor discharge lamp.

15. A control and indicator circuit as claimed in claim 4 wherein the resistances of said resistor means and said further resistor means are approximately equal.

16. A control and indicator circuit as claimed in claim 6 wherein said third series circuit comprises said resistor and said indicator, said further switch means being connected at said other side between said resistor and said indicator.

17. A control and indicator circuit as claimed in claim 6 wherein said further switch means is connected in series with said thermostatic switch means and said resistor.

18. A control and indicator circuit as claimed in claim 6 wherein said further switch means is connected in series with said resistor, the further switch means and the resistor being connected in parallel with said thermostatic switch means.

* * * * *

UNITED STATES PATENT AND TRADEMARK OFFICE
CERTIFICATE OF CORRECTION

PATENT NO. : 4,874,929

DATED : October 17, 1989

INVENTOR(S) : Philip H. Houser

It is certified that error appears in the above-identified patent and that said Letters Patent is hereby corrected as shown below:

```
Column 3, line 22, ""boil"" should be --"broil"--;
column 3, line 27, "throgh" should be --through--.
Column 5, line 14, "FIG. 2" should be --FIG. 3--.
Claim 14, line 3, "hcarge" should be --charge--.
```

Signed and Sealed this

Second Day of April, 1991

Attest:

HARRY F. MANBECK, JR.

Attesting Officer

Commissioner of Patents and Trademarks